United States Patent [19]
Mansey et al.

[11] Patent Number: 6,023,499
[45] Date of Patent: Feb. 8, 2000

[54] REAL TIME BILLING VIA THE INTERNET FOR ADVANCED INTELLIGENT NETWORK SERVICES

[75] Inventors: Pradeep Parsram Mansey, Coral Springs; Baiju Dhirajlal Mandalia, Boca Raton, both of Fla.

[73] Assignee: International Business Machines Corporation, Armonk, N.Y.

[21] Appl. No.: 08/979,157

[22] Filed: Nov. 26, 1997

[51] Int. Cl.[7] .................................................. H04M 15/00
[52] U.S. Cl. ......................... 379/111; 379/114; 379/124; 379/206
[58] Field of Search ................... 379/114, 115, 379/116, 119, 121, 122, 191, 196, 202, 204, 206, 207, 111, 93.21, 93.01, 229, 900, 124

[56] References Cited

U.S. PATENT DOCUMENTS

| | | | |
|---|---|---|---|
| 5,737,414 | 4/1998 | Walker et al. ............................... | 380/4 |
| 5,828,743 | 10/1998 | Pinnell et al. ............................ | 379/204 |
| 5,862,203 | 1/1999 | Wulkan et al. ........................... | 379/114 |
| 5,867,494 | 2/1999 | Krishnaswamy ......................... | 370/352 |

FOREIGN PATENT DOCUMENTS

WO96/38018  11/1996  WIPO ............................. H04Q 11/04

*Primary Examiner*—Curtis A. Kuntz
*Assistant Examiner*—Binh K. Tieu
*Attorney, Agent, or Firm*—Quarles & Brady LLP

[57] ABSTRACT

The present method provides a technique for real-time monitoring of charges for using a communication network service, thereby enabling a user to continuously know the charges incurred during each usage. The user also is able to define a charge limit prior to using the service and the usage terminates automatically when the accumulated charge reaches that limit. The present method is particularly adapted to monitoring charges associated with a telephone conference call.

13 Claims, 2 Drawing Sheets

REAL TIME BILLING VIA THE INTERNET FOR ADVANCED INTELLIGENT NETWORK SERVICES

The present invention relates to generally to telephone systems, and in particular, to telephone billing systems for central office switches that provide advanced intelligent network (AIN) operations and services.

BACKGROUND OF THE INVENTION

Over the past few years, the number of new services and features offered over telephone networks has grown. These enhanced telephone networks are knows as "Advanced Intelligent Networks" (AINs). Telephone control networks conforming to AIN architecture contain intelligent subsystems for controlling switched traffic and user services such as conference calls, call waiting, call forwarding, voice announcements, voice response, keyboard response, etc. These intelligent subsystems, called "intelligent peripherals" (IP), are configured for specific regional calling services.

Multi-processor systems used as an AIN system are disclosed in patent application Ser. No. 08/792,018 by Deborah L. Acker and Thomas E. Creamer, which is assigned to International Business Machines (IBM) and the disclosure of which is incorporated herein by reference.

For a conference call, the host caller instructs the intelligent peripheral to connect each conference participant. A telephone switch then establishes a separate leg of the conference by calling each participant and connecting together the telephone line for each leg. A given leg may be a local or a long distance call. Billing is based on a per minute rate for each leg of the call and the rate typically is higher than a rate for a two party call along the same leg. Thus, different rates usually apply to each leg of the conference call. It is apparent that the charges accumulate at a rapid rate when there are a number of parties connected by legs to which long distance toll charges apply. Therefore, it is desirable for one or more conference participants to be able to monitor the accumulated charges for a conference call on a real-time basis while the call is taking place. However, real-time monitoring of conference call charges is further complicated by participants joining and dropping from the call at different times.

It may be desirable to place a monetary limit on the total charges for the conference call so that the call does not exceed a budgeted amount. By limiting the call duration in this manner, forces the participants to adhere to an agenda for the call and not be verbose.

It is customary that telephone and other types of network services are billed on a periodic, e.g. monthly, basis. A bill for a given call is not issued until the end of the billing cycle in which the call occurred and then the customer has several weeks to make payment. It is advantageous to bill and receive payment for service as soon after delivery as possible. Thus it is desirable, immediately after the completion of the call, to automatically submit a bill for a particular service to a credit or debit account maintained by a third party service provider, such as a bank credit card operation.

SUMMARY OF THE INVENTION

The general object of the present invention is to provide real-time billing of advanced intelligent network services.

Another object is to enable the suer of the advanced network services to monitor the service charges which are accumulating during service use.

A further object of the present invention is to enable the user at the commencement of service to place a monetary limit on the total charge for that particular usage and to have that usage terminate automatically when that limit is reached.

Yet another object is to provide billing of enhanced network service automatically to a credit or debit account following each use.

These and other objectives are satisfied by a method of monitoring charges for a service provided by an advanced intelligent communication network wherein the method detects occurrences of billing events which take place during use of the service. When a billing even occurs, a charge fee associated with the event is added to a cumulative charge total for the service. The cumulative charge total is occasionally transmitted via the Internet to a device located with a person using the service. For example the transmission occurs whenever the cumulative charge total changes. The device displays the cumulative charge total received from the Internet to the person while the service is being used.

In this manner the running costs of the service are continuously being tracked and displayed to the person during usage of the service. This enables a suer to know at any give point in time how much the current use of the service has cost.

The preferred embodiment of this method allows the user to define a maximum cost limit for a particular use of the service. When the cumulative charge total reaches that maximum cost limit, the use of the service automatically terminates.

For example this method has particular application to telephone conference call services. Here a running subtotal of the charges for each telephone line connected to the conference is maintain even where different usage rates apply to each telephone line and where telephone liens are connected to and disconnected from the conference at different points in time. The per line subtotals also are sent and displayed to the conference participant.

DETAILED DESCRIPTION OF THE INVENTION

Figure 1:
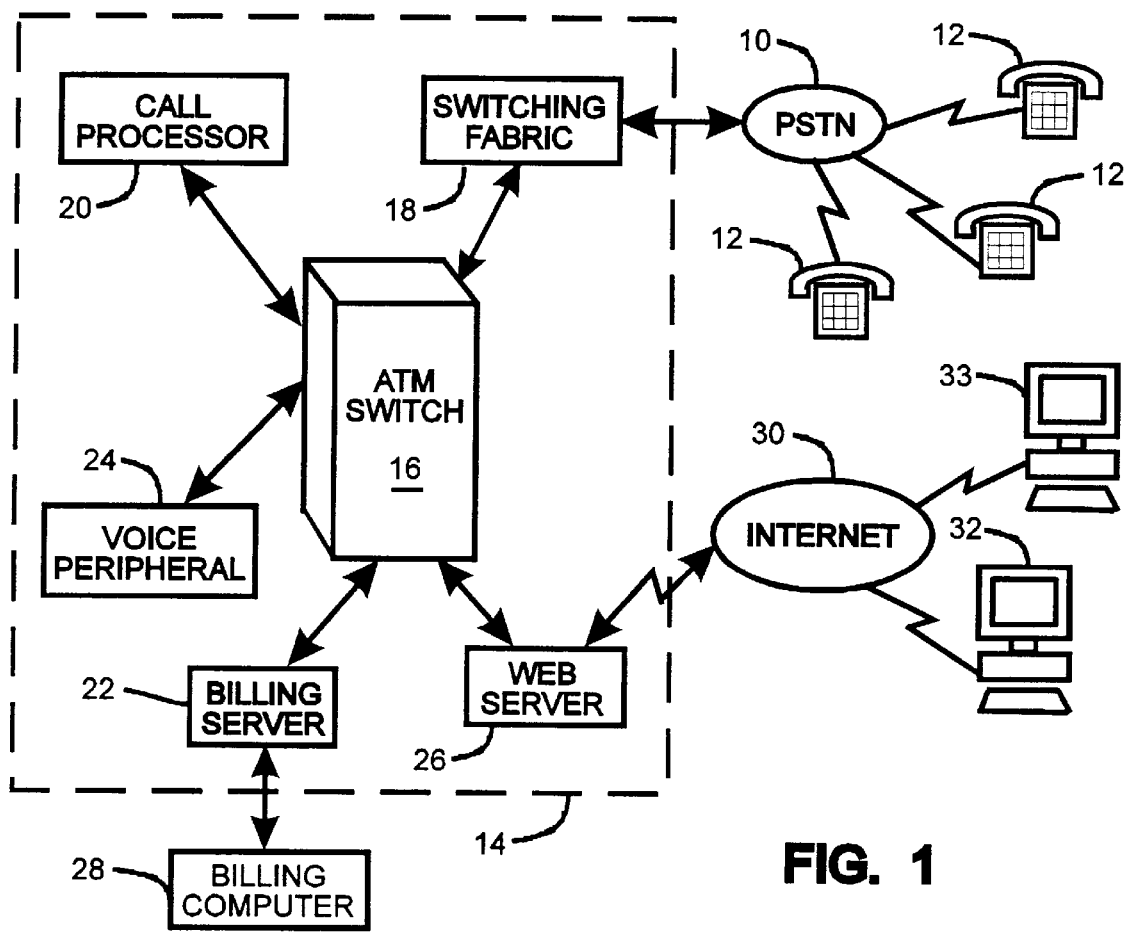
FIG. 1 is a functional block diagram of a telephone network which conforms to the AIN architecture.

With initial reference to FIG. 1 a public switched telephone network (PSTN) 10 conforms to the architecture for an advanced intelligent network (AIN). Further information about AIN architecture can be obtained by referring to one or more of the following published documents, whose teachings are incorporated herein by reference:

Bellcore, GR-2802-CORE, Advanced Intelligent Network (AIN) 0.X Issue 1, Generic Requirements, Issue 2, December 1993. Bellcore, GR-1129-CORE, Advanced Intelligent Network (AIN) 0.2 Switch Intelligent Peripheral Interface (IPI) Generic Requirements, ILC 1E, November 1994.

A plurality of telephones 12 are connected to local lines of the PSTN. It is understood that some of these connections may involve long distance connections within the PSTN.

Also connected to the PSTN 10 is an intelligent peripheral 14 which provides switched connections for telephone calls passing through a regional node of the PSTN (e.g. between local and trunk lines traversing the node), and which controls service applications associated with the respective calls. These service applications include enhanced voice services, such as multiple party conferencing, voice announcements, speech recognition, call waiting, and call forwarding, for example.

The hardware of the intelligent peripheral 14 may be based upon an IBM intelligent peripheral system which elements include a "switch fabric" complex 18, a call processor 20, a billing server 22 and voice peripheral processor 24. Critical components such as the voice peripheral processor 24 and call processor 20 are configured redundantly to ensure continuous availability in case of any component failure. Voice and data connections among those components of the intelligent peripheral 14 are provided by a local area network, commonly referred to as an asynchronous transfer mode (ATM) switch 16.

The intelligent peripheral 14 is coupled to the PSTN 10 by the "switching fabric" complex 18, which is a conventional telephone switch that interconnects lines of the PSTN 10 to establish a two-party telephone call or a conference call involving the interconnection of a greater number of PSTN lines. The call processor 20 implements a call model which defines the procedure when a call comes into the switching fabric 18. With respect to the present invention, the switching fabric 18 provides the physical connection of the PSTN lines to form the conference call. The billing server 22 utilizes a set of custom application programming interfaces (APIs). When billing is initiated for a particular service, the billing server 22 receives the identification of the service provided, the telephone numbers involved in the service and the originating line number. The APIs sequence consists of opening the billing process, populating the billing elements with the appropriate billing information, such as the date of the transaction, connect time of the transaction, disconnect time of the transaction, originating telephone number, the terminating telephone number or numbers, type of service, billing type, billing rates, and cumulative charge amount. The billing server 22 provides the appropriate billing data on a per transaction per subscriber basis. The billing can be designed on a time duration of usage or a per usage basis. Once the API closes the billing process for a given service transaction, the raw billing data is composed into an acceptable format and sent to the billing computer system 28 for the network serve provider.

Another component of the intelligent peripheral 14 is the voice peripheral processor 24 which provides digitally stored audio messages or digitally synthesized voice messages which provide information to the caller regarding the status. For example, these messages state that the caller has reached a non-working number, or prompts the user to enter commands via a telephone's keypad to select service functions.

For the present invention, the standard intelligent peripheral 14 has been enhanced with the addition of a conventional web server 26 to interface the intelligent peripheral to the Internet 30. This allows personal computers 32 and 33 connected to the Internet to access the intelligent peripheral 14 to set up different enhanced voice service. With respect to the present invention, a customer can setup a conference call via the Internet and during the call receive real-time billing information on a personal computer 32.

The software for implementing the present billing technique is stored within the components of the intelligent peripheral 14. The present billing technique is best understood in the context of an automated conference call, one that is established and managed without requiring intervention by a human operator. Nevertheless, one skilled in the art will understand and appreciate that the present billing techniques can be applied to other forms of enhanced voice service and even other types of communication networks than just telephone systems.

Figure 2:
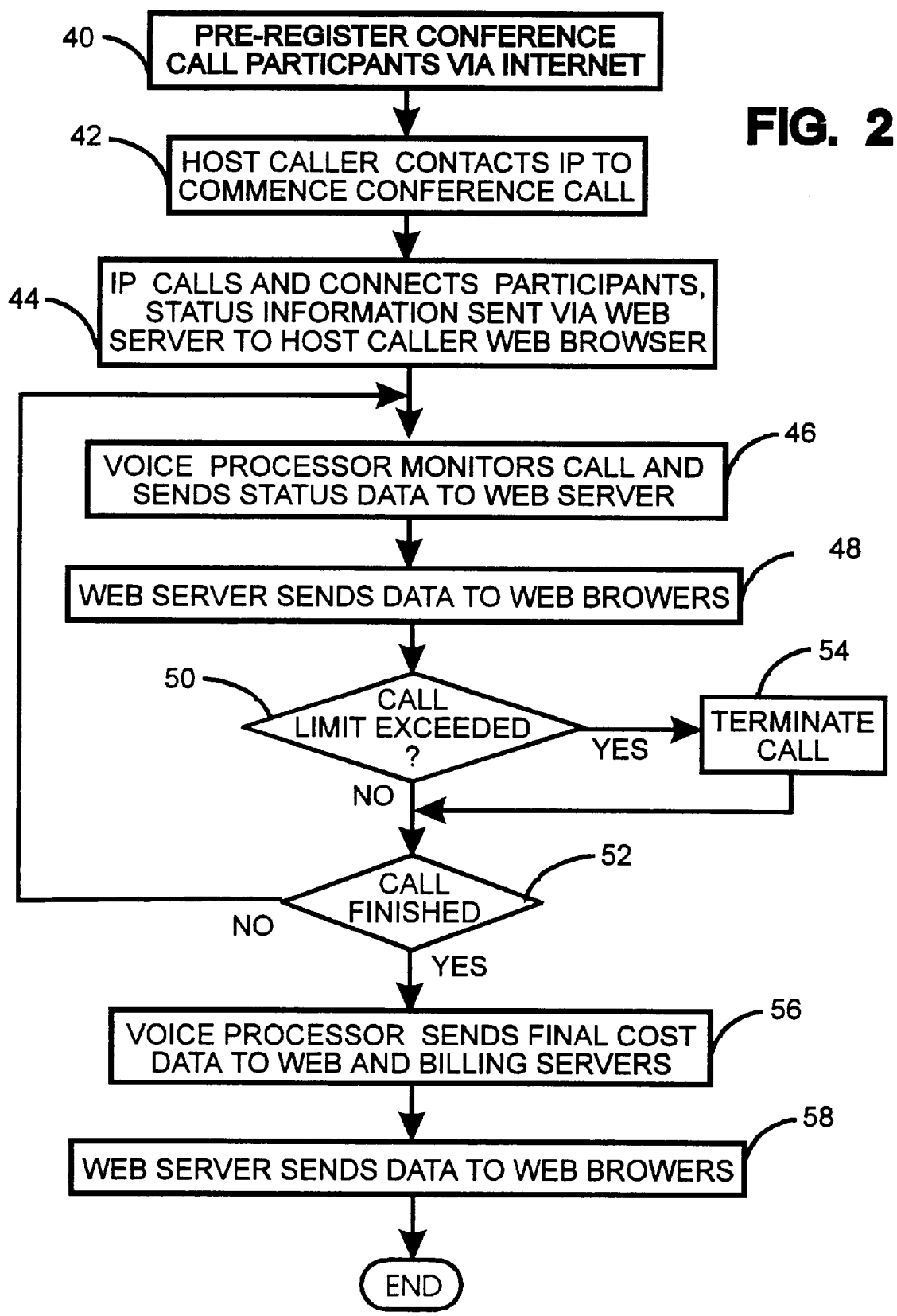
FIG. 2 is a flow chart of the process implemented on the network for real-time billing of extended telephone services, according to the present invention.

A conference call commences at step 40 on FIG. 2 by a host of the conference call, hereinafter referred to as the "host caller", accessing the intelligent peripheral 14 to set up the conference call. This pre-registration of the conference call may take place either at the beginning of the call or some greater time prior to the call, for example at a point when all of the participants have agreed to be available at a given time. The host caller can perform the pre-registration either by accessing the intelligent peripheral 14 by one of the telephones 12 or from a personal computer 32 via the Internet 30. In the case of accessing the intelligent peripheral via a telephone 12, the host caller dials an "800" telephone number assigned for this purpose. The incoming telephone call initiates a procedure in which the voice peripheral processor 24 issues step by step voice prompts to the host caller requesting information regarding the time of the call and telephone numbers for each of the call participants. The host caller enters the requested information via the telephone keypad. Similar access of the intelligent peripheral 14 via the Internet and the IP web server 26 causes the web server to send the host caller's personal computer 32 a series of display screens on which the host caller enters the necessary information for establishing a conference call. Other types of enhanced voice services may be initiated in the same manner, either via a telephone or the Internet connection. The information that the host caller provides to the intelligent peripheral 14 is stored in the call processor 20 until it is time to commence the conference call.

The conference call may be commenced automatically by the intelligent peripheral 14 or upon the host caller accessing the intelligent peripheral again. If during pre-registration, automatic commencement was indicated, the intelligent peripheral, and specifically the call processor 20 will initiate the conference call at the designated data and time. In this instance, the call processor 20 will call each of the participants via the switching fabric 18 and as each telephone call is answered, the voice peripheral processor 24 transmits an audio message informing the participant that this is the conference call. Then the switching fabric 18 connects the respective PSTN lines together in the conventional conference call format at step 44.

Alternatively, at step 42 the host caller may contact the intelligent peripheral either via one of the telephones 12, by dialing the appropriate "800" telephone number, or via access through the Internet 30 to the IP web server 26. In this situation, the intelligent peripheral requests the host caller by to enter a passcode that was assigned to the call during the pre-registration process. This passcode is forwarded to voice peripheral processor 24 which retrieves the pre-registration information from memory and uses that information to establish the conference call.

It is also understood that a peripheral also may join the conference call via an audio connection through the Internet 30. In this case, the person accesses the intelligent peripheral 14 via a personal computer 32 connected through the Internet 30 to the IP web server 26. The person then selects the hyperlink displayed on the web server's home page for joining a conference call and the personal computer 32 accessing the web server 26 then will receive a query to enter the pass code for the call to be joined. Thereafter, a voice path is established by the ATM switch 16 between the switching fabric 18 which handles the telephone calls of the conference and the web server 26. A peripheral connected via the Internet 30 is treated in the same manner as a call peripheral via the telephone and the PSTN 10. Such an Internet connection will have a specified billing rate per interval of connect time ($0.50 US per minute).

In order to monitor the status of the conference call in real-time, the host caller or anyone else can access the intelligent peripheral 14 via the Internet and web server 26. Upon selecting hyperlink for call monitoring on the web server's home page, the accessing personal computer 32 or 33 will receive a query to enter the pass code for the call to be monitored. In response to receiving a valid pass code, the intelligent peripheral 14 begins sending the conference call status information to that personal computer 32 or 33 for the web browser to display.

As the telephone lines forming the conference legs are connected, the status (connected or disconnected) of each leg of the conference call is sent by the voice peripheral processor 24 through the ATM switch 16 to the web server 26 where the call status is formatted into display data and sent over the Internet to the host caller's computer 32. This enables the host caller to monitor the call status and know when each participant has joined the conference.

When all of the participants who have answered the calls from the call processor 20 have been interconnected by the switching fabric 18, the conference call processing program advances to step 46. It is understood that when one or more of the designated participants does not answer the initiating telephone call, the conference application will periodically place the call again in an attempt to reach that participant and connect him or her into the conference. At step 46, the voice peripheral processor 24 monitors the conference call to determine whether any of the participants has dropped out of the conference, i.e. hung up the phone.

As a billing increment of time elapses (e.g. every X seconds, where X is a positive number) for each leg of the conference call, the charge amount for that leg is increased by the per increment toll charge thereby producing a running subtotal for each leg of the conference call. In addition, the running subtotals for each leg are summed to produce a cumulative total for the entire conference call. It should be understood that because each leg was connected at slightly different times the billing periods will be different.

Each time one of the running subtotals for a conference leg is increased, the new charge amounts are sent from voice peripheral processor 24 through the ATM switch 16 to the web server 26. The Web server 26 places the new charge information into a data packet which is transmitted via the Internet 30 at step 48 to the host caller's computer 32 where the amounts are displayed. This provides real-time cost data to the host caller which indicates the running subtotal for each leg of the conference call and the total amount for the call.

When a participant drops out of the conference call, the disconnect status is indicated to the host caller via the Internet connection. The running subtotal charge for that leg of the conference stop being incremented, but the final subtotal amount continues to be added into the cumulative total for the conference.

After sending updated data on the status and charges of the conference call, the voice peripheral processor 24 determines at step 50 whether the cumulative total has exceeded a dollar limit for the conference call which was established during the pre-registration (at step 40). This dollar limit function may or may not be implemented by the host caller. Until the call limit is exceeded, the real-time billing procedure advances to step 52 where a determination is made whether the cell is finished. If not, the process returns to step 46 so that the call processor can continue to monitor the conference.

When the cumulative charge of the call is found at step 50 to exceed the established call limit, the process branches to step 54 where the voice peripheral processor 24 instructs call processor 20 to terminate all of the conference call connections in the switching fabric 18. In practice, the voice peripheral processor 24 may be configured to detect when the cumulative charge for the call is approaching the call limit, i.e. the cumulative charge reaching a pre-defined dollar amount below the call limit. At that time the voice peripheral processor 24 sends an audio message via the switching fabric 18 to the conference participants alerting them at the call is approaching the dollar limit. A further enhancement of the present technique allows the host caller at this time to increase the dollar a limit via the personal computer Internet connection, thereby allowing the call to continue beyond the previously defined termination point.

Eventually when either all of the participants have hung up or termination occurs at step 54, completion of the conference call is detected at step 52 and the billing procedure advances to step 56. At this time the voice peripheral processor 24 sends the final cumulative charge to the billing server 22 along with other information regarding the conference call connection as outlined above. This data enables the billing server 22 to prepare and send a data packet to the billing computer system 28 of the network service provider so that the conference call charge will appear on the next statement of the host caller. At the same time, the cumulative cost information is sent to the web server 26 which then at step 58 sends the final call information via the Internet to the host caller's web browser on computer 32 and to the web browsers on any other personal computers connected to the Internet that were designated in the pre-registration information. The billing process then terminates.

As an alternative to the billing server 22 forwarding information about the conference call to the network provider's billing computer system 28, the intelligent peripheral 14 may send a transactional message via the web server 26 and the Internet 30 to a credit card account, debit account or an electronic commerce system maintained by a third party. Such third-party billing provides faster payment to the network provider than relying upon the provider's normal billing cycle and customer payment periods.

We claim:

1. A method of monitoring charges for a conference call service provided by an advanced intelligent communication network, which method comprises the steps of:

detecting occurrences of conference call billing events which occur during use of the service;

when a billing event occurs, adding a charge fee associated with the event to a cumulative charge total for the service;

during use of the service, periodically transmitting the cumulative charge total via the Internet to a device located with a person using the service; and periodically updating a display showing the cumulative charge total received from the Internet to the person while the service is being used.

2. The method as recited in claim 1 further comprising:

storing a limit on the total charge for the service which limit is defined by a user of the service; and terminating further use of the service when the cumulative charge total reaches the limit on the total charge.

3. The method as recited in claim 1 further comprising, at the completion of a usage of the service, a provider of the advanced intelligent communication network sending the cumulative charge total to one of a credit card account, a debit account or an electronic commerce system which is operated by other than the provider.

4. The method as recited in claim 1 wherein the step of detecting occurrences of billing events comprises detecting each time a predetermined period of time elapses during use of the service.

5. The method as recited in claim 1 wherein the service is a conference call service, and the step of adding a charge fee comprises, for each communication line connected to a conference call, adding the charge fee associated with a given communication line to the cumulative charge total every X seconds while that given communication line is connected to the conference call, where X is a positive number.

6. The method as recited in claim 1 wherein the service is a conference call service which interconnects several communication lines, and the step of adding a charge fee comprises adding a charge fee associated with a given communication line to a running subtotal for that given communication line every X seconds while that given communication line is connected to a conference call, wherein X is a positive number; and producing the cumulative charge total which is a function of a summation of the subtotal for each communication line.

7. The method as recited in claim 6 further comprising:
    transmitting the subtotal for each communication line to the device located with a person using the service; and
    displaying the subtotal for each communication line, received from the Internet, to the person while the service is being used.

8. The method as recited in claim 1 wherein the service provides a conference call involving a plurality of participants, and further comprising:
    periodically transmitting, via the Internet to the device located with a person using the service, an indication of whether each participant is connected to the conference call; and
    displaying each indication to the person while the service is being used.

9. A method of billing for a conference call involving an interconnection of a plurality of communication lines, which method comprises steps of:
    for each communication line in response to an occurrence of a predefined billing event while that communication line is connected to the conference call, adding a charge fee associated with the billing event to a cumulative charge total for the conference call;
    occasionally transmitting the cumulative charge total via the Internet to a device located with a participant in the conference call; and
    displaying the cumulative charge total received from the Internet to the participant during the conference call.

10. The method as recited in claim 9 wherein the step of adding a charge fee comprises adding a charge fee to a running subtotal for that communication line every X seconds while that communication line is connected to the conference call, where X is a positive number; and producing the conference charge total by summing the subtotal for each communication line.

11. The method as recited in claim 10 further comprising:
    occasionally transmitting the subtotal for each communication line via the Internet to the device located with participant in the conference call; and
    displaying the subtotal for each communication line received from the Internet to the participant while the conference call is occurring.

12. The method as recited in claim 9 further comprising:
    storing a user defined limit on the total charge for the conference call; and
    terminating the conference call when the cumulative charge total reaches the limit on the total charge.

13. The method as recited in claim 9 further comprising:
    periodically transmitting, via the Internet to the device located with a person using the service, an indication of whether each of the plurality of communication is connected to the conference call; and
    displaying each indication to the person while the service is being used.

* * * * *